Figure 1:
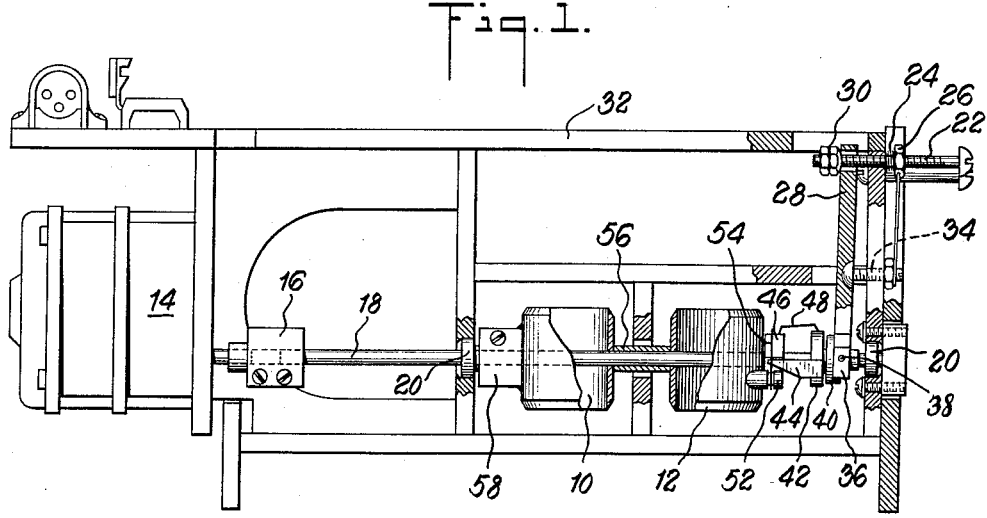

Jan. 19, 1960 C. E. FRICK ET AL 2,922,045
BEAM-CHOPPER MEANS FOR RADIANT ENERGY BEAMS
Filed Dec. 18, 1957

INVENTORS
CHARLES E. FRICK
CHARLES G. FELLOWS

BY
ATTORNEY

United States Patent Office 2,922,045
Patented Jan. 19, 1960

2,922,045

BEAM-CHOPPER MEANS FOR RADIANT ENERGY BEAMS

Charles E. Frick, South Charleston, and Charles G. Fellows, Alum Creek, W. Va., assignors to Union Carbide Corporation, a corporation of New York Application December 18, 1957, Serial No. 703,652

8 Claims. (Cl. 250—43.5)

This invention relates to certain improvements in radiant energy apparatus and, more particularly, to means for shifting the phase relationship between two rotating beam choppers commonly employed in the parallel energy paths of infra-red gas analyzers.

Novel means for analyzing gases by the use of infrared energy are disclosed in copending application Serial No. 439,632, filed June 28, 1954, by Spracklen et al. and entitled "Selective Infra-Red Gas Analyzer." This device makes use of the fact that gases vary in their ability to absorb infra-red energy and such ability is reflected by a change in pressure of a contained gas. Two cylindrical gas chambers are used for containing, respectively, a sample gas and a reference gas. An infra-red energy source is provided at the upper end of each chamber. The lower ends of the chambers are joined and the gases are separated by a flexible diaphragm. The flexure of the diaphragm then becomes proportional to the difference in pressure which, in turn, indicates the amount of the particular gas component present.

This apparatus employs in each of two parallel energy paths, a "beam chopper" for periodically interrupting, in the proper sequence, the infra-red energy passing through the parallel gas paths or columns. This periodic "chopping" action is effected in order to provide an amplifiable alternating current output signal. Phasing between the "chopping" action in the two parallel infrared energy paths is required in order to compensate for the different rates of energy absorption of the dissimilar gases contained in the two parallel paths. Thus, the sensing element of the gas analyzer receives energy from the two paths at the same time regardless of the difference in energy absorption rates of the gases in the paths.

The beam chopper of the Spracklen et al. application makes use of two circular disc segments, each rotating in a different gas column, to interrupt and phase the parallel infra-red energy beams. These disc segments are shifted in phase relationship by the axial movement of a shaft and the screw gears thereon. The screw gears have opposite pitches and their axial displacement creates a phasing realignment of their associated pinion gears which, in turn, drive the disc shutters. Because of this dynamic phasing adjustment, it becomes possible to vary the phase relationship of the infra-red energy admitted to the gas columns without arresting the chopping of the parallel energy beams. In this manner, the proper phasing may be effected by a simple manual adjustment combined with observation of the output signal.

The chopper of the Spracklen et al. application, while capable of performing in a generally satisfactory manner, retains the following undesirable characteristics: there are too many moving components, frequent mechanical adjustments are required to compensate for wear; close tolerances must be maintained in construction to assure proper functioning; and the dynamic adjustment does not operate as smoothly as desired.

As a result of these limitations, the prior chopper means is expensive to manufacture, difficult to repair, and presents difficulties in dynamic adjustment.

Various expedients and modifications were attempted to provide more reliable and less expensive chopper means. Differential gears, for example, were used in one modification to provide dynamic phasing. While this device was somewhat less expensive, there were still far too many moving parts.

Another modification investigated employed two coaxial rotating drums. Each drum contained two windows so positioned that light would pass through them in a direction normal to the longitudinal axes of the drums. This chopping arrangement was not considered satisfactory because of the high loss of infra-red energy within the drums due to random internal reflections.

Therefore, objects of the present invention are to provide, for parallel energy paths of an infra-red gas analyzer, a dynamically phase-adjustable beam chopper having a minimum of moving parts; to provide such a dynamically phase-adjustable beam chopper which may be constructed without close attention to tolerances; to provide such a beam chopper which will operate smoothly and efficiently in dynamically phase-adjusting the chopping of parallel infra-red energy beams; and to provide such a dynamically phase-adjustable beam chopper which will allow the passage of infra-red energy during the transmitting positions of the chopper cycle without substantial loss of energy.

In accordance with the present invention, an infrared gas analyzer or controller is provided having parallel path energy beam chopping means comprising first energy chopper tube means positioned in one of the energy paths, second energy chopper tube means positioned in the other parallel energy path, each of the chopper tube means rotatably mounted on an axis transverse to the longitudinal axis of the tube, and means for dynamically phase-adjusting the rotation of the chopper tubes.

Figure 2:
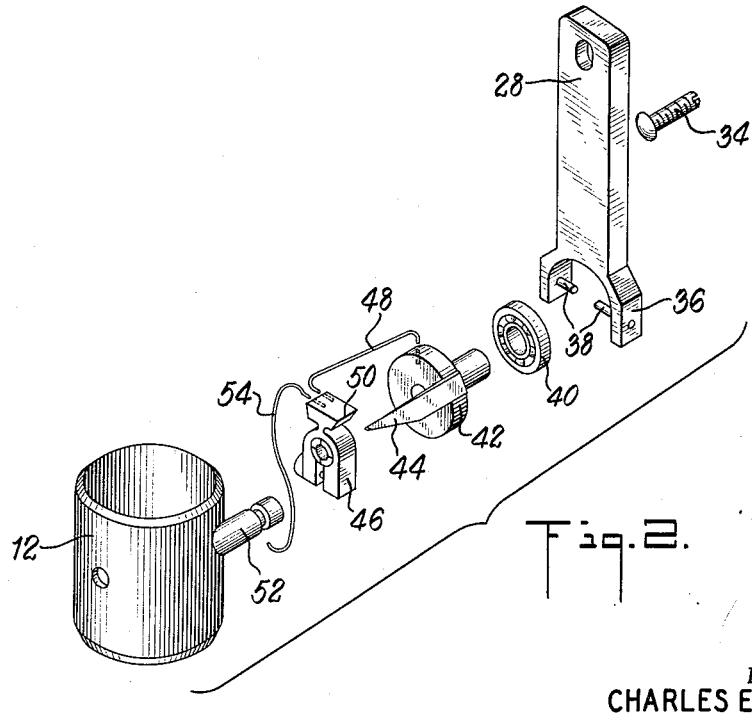

In the drawings:

Fig. 1 is a plan view of the apparatus of the invention, portions being in section; and Fig. 2 is an exploded view showing the inter-relationship between the components of one parallel energy path chopper of the apparatus of Fig. 1.

Referring specifically to the embodiment of the drawings, a fixed tube 10 and a phasing tube 12 are rotated about their transverse axes by drive motor 14 through coupling 16 and drive shaft 18. Drive shaft 18 is supported by bearings 20. In the position illustrated in Fig. 1, infra-red energy beams passing normal to the drawing surface would be blocked by the opaque walls of tubes 10 and 12. When the tubes have rotated 90°, however, they will be in position to admit the flow of energy throughout their length. In this manner, the energy beam is alternately allowed to pass through a cylindrical opening and blocked from passage at 90° intervals of rotation. By varying the length of the tubes, the enclosed area, shape, and length of the emergent beams may be varied so that a certain desired symmetry of waveform may be achieved.

In the apparatus of the invention, the chopper tubes are phaseably rotatable with respect to each other in order that the chopping intervals of the beams passing through the two gas columns may be varied while the instrument is in operation and while shaft 18 is rotating.

Fixed tube 10 and phasing tube 12 are mounted on shaft 18 so that their longitudinal axes are normal to their axes of rotation. The internal surfaces of both tubes are preferably polished to provide a higher transmittance of infra-red energy. Adjustment of phasing tube 12 is possible while the tubes are rotating by means of phase adjustment screw 22 which is spring loaded by spring 24 and nut 26 to prevent undesirable movement. The end of phase adjustment screw 22 passes through an opening in phasing lever 28 and is provided with a stop nut 30 which engages one end of phasing lever 28. Stop nut 30 is preferably somewhat rounded to allow free movement of phasing lever 28 so as to prevent binding and assist in the self-alignment which is inherent in the mechanism of the invention.

Thus, it will be seen that rotation of phase adjustment screw 22 in frame 32 will cause axial displacement of stop nut 30 and consequent varying restraint of the upper end of phasing lever 28. Fulcrum screw 34 forms an adjustable fulcrum about which phasing lever 28 rotates. The lower end of phasing lever 28 is provided with a clevis 36 and stop pins 38 positioned at either side of drive shaft 18. Stop pins 38 engage ball thrust bearing 40 which encircles drive shaft 18 and is in rotatable and axially sliding relationship thereto. Ball thrust bearing 40 abuts against wedge collar 42 and attached wedge 44. Wedge collar 42 and wedge 44 are maintained in a displaced position from driving clamp 46 by lever loading spring 48. Driving clamp 46 is affixed to drive shaft 18 and rotates therewith.

From the above description it will be seen that lever loading spring 48 in compression from axially fixed driving clamp 46 applies loading force to slidable wedge collar 42, slidable ball thrust bearing 40, and stop pins 38 located in the clevis 36 of phasing lever 28. Therefore, any rotation of phasing screw 22 will result in axial displacement of wedge 44 along shaft 18. For one direction of rotation of phasing screw 22 this displacement will be against lever loading spring 48, while rotation in the opposite direction will assist displacement by the spring.

Actual phase adjustment of phasing tube 12 is accomplished by the insertion of wedge 44 between driving stud 50 of driving clamp 46 and phasing tube adjustment pin 52. Tube loading spring 54 tends to hold phasing tube 12 firm against the wedge 44 and serves to return the cylinder to its original position as the wedge 44 is withdrawn.

As neither phasing tube 12 nor wedge 44 are fixed on the drive shaft 18, rotation is achieved by means of fixed driving clamp 46 in combination with spring 54.

Phasing tube 12 is axially displaced from fixed tube 10 by means of slidable collar 56. Fixed tube 10 is soldered to clamp 58 which is affixed to drive shaft 18. That force vector of wedge 44 which is parallel to shaft 18 serves to hold the phasing and fixed tubes in axial position.

While the description of the invention has been directed to an improved beam chopper mechanism for energy beams in infra-red gas analyzers, it is to be understood that the invention is not so limited but is equally adaptable to the interruption of infra-red energy for other applications as well as to the interruption of other forms of radiant energy.

What is claimed is:

1. In an infra-red gas analyzer comprising first and second gas columns through which infra-red energy beams are passed, means for periodically alternately blocking and passing said energy beams comprising, in combination, a bracket; a rotatable shaft supported by said bracket; and in axially spaced relationship along said rotatable shaft a first tube affixed to said shaft to rotate about an axis transverse to its longitudinal axis to alternately block and pass said infra-red energy beams through said first gas column; a second tube relatively rotatable about said shaft to rotate about an axis transverse to its longitudinal axis to alternately block and pass said infra-red energy beams through said second gas column, said second tube having a projection thereon; a driving stud affixed to said rotatable shaft in driving relation to said projection of said second tube and separated therefrom by wedge means in axial sliding relation to said rotatable shaft to rotate said second tube relative to said rotatable shaft during the rotation thereof when said wedge means is axially displaced along said rotatable shaft.

2. In combination, a bracket, a rotatable shaft supported by said bracket, and in axially spaced relationship along said rotatable shaft a first tube affixed to said rotatable shaft, a second tube having a projection thereon and relatively rotatable about said rotatable shaft, and a driving stud affixed to said rotatable shaft in driving relation to said projection of said second tube and separated therefrom by wedge means in axial sliding relation to said rotatable shaft to rotate said second tube relative to said rotatable shaft during the rotation thereof when said wedge means is axially displaced along said rotatable shaft.

3. In combination, a bracket, a rotatable shaft supported by said bracket, and in axially spaced relationship along said rotatable shaft a first shortened cylindrical tube affixed to said rotatable shaft, a second shortened cylindrical tube having a projection thereon and relatively rotatable about said rotatable shaft, and a driving stud affixed to said rotatable shaft in driving relation to said projection of said second tube and separated therefrom by wedge means in axial sliding relation to said rotatable shaft to rotate said second shortened cylindrical tube relative to said rotatable shaft during the rotation thereof when said wedge means is axially displaced along said rotatable shaft.

4. In combination, a bracket, a rotatable shaft supported by said bracket, means for rotating said shaft, and in axially spaced relationship along said rotatable shaft a first shortened cylindrical tube affixed to said rotatable shaft, a second shortened cylindrical tube having a projection thereon and relatively rotatable about said rotatable shaft, and a driving stud affixed to said rotatable shaft in driving relation to said projection of said second tube and separated therefrom by wedge means in axial sliding relation to said rotatable shaft to rotate said second shortened cylindrical tube relative to said rotatable shaft during the rotation thereof when said wedge means is axially displaced along said rotatable shaft.

5. Parallel-beam radiant energy chopping means comprising in combination, a bracket, a rotatable shaft supported by said bracket, and in axially spaced relationship along said rotatable shaft a first tube affixed to said rotatable shaft, a second tube having a projection thereon and relatively rotatable about said rotatable shaft, and a driving stud affixed to said rotatable shaft in driving relation to said projection of said second tube and separated therefrom by wedge means in axial sliding relation to said rotatable shaft to rotate said second shortened cylindrical tube relative to said rotatable shaft during the rotation thereof when said wedge means is axially displaced along said rotatable shaft and means for axially displacing said wedge means.

6. In combination, a bracket, a rotatable shaft supported by said bracket, and in axially spaced relationship along said rotatable shaft, a second tube having a projection thereon and relatively rotatable about said rotatable shaft, and a driving stud affixed to said rotatable shaft in driving relation to said projection of said second tube and separated therefrom by wedge means in axial sliding relation to said rotatable shaft to rotate said second shortened cylindrical tube relative to said rotatable shaft during the rotation thereof when said wedge means is axially displaced along said rotatable shaft, means for axially displacing said wedge means comprising an axially slidable thrust bearing in abutting relationship to said wedge means.

7. In combination, a bracket, a rotatable shaft supported by said bracket, and in axially spaced relationship along said rotatable shaft a first tube affixed to said rotatable shaft, a second tube having a projection thereon and relatively rotatable about said rotatable shaft, and a driving stud affixed to said rotatable shaft in driving relation to said projection of said second tube and separated therefrom by wedge means in axial sliding relation to said rotatable shaft to rotate said second shortened cylindrical tube relative to said rotatable shaft during the rotation thereof when said wedge means is axially displaced along said rotatable shaft, means for axially displacing said wedge means comprising an axially slidable thrust bearing in abutting relationship to said wedge means and movable along said rotatable shaft by axial displacement adjustment means relatively stationary with respect to said rotatable shaft.

8. In combination, a bracket, a rotatable shaft supported by said bracket, and in axially spaced relationship along said rotatable shaft a first tube affixed to said rotatable shaft, a second tube having a projection thereon and relatively rotatable about said rotatable shaft, and a driving stud affixed to said rotatable shaft in driving relation to said projection of said second tube and separated therefrom by wedge means in axial sliding relation to said rotatable shaft to rotate said second shortened cylindrical tube relative to said rotatable shaft during the rotation thereof when said wedge means is axially displaced along said rotatable shaft, means for axially displacing said wedge means comprising an axially slidable thrust bearing in abutting relationship to said wedge means and movable along said rotatable shaft by axial displacement adjustment means relatively stationary with respect to said rotatable shaft and movable along said rotatable shaft by the axial displacement of a lever having adjustment means and a fixed fulcrum.

References Cited in the file of this patent

UNITED STATES PATENTS

| | | |
|---|---|---|
| 2,469,206 | Rich | May 3, 1949 |
| 2,673,297 | Miller | Mar. 23, 1954 |
| 2,674,696 | Smith et al. | Apr. 6, 1954 |
| 2,754,424 | Woodhull et al. | July 10, 1956 |